United States Patent [19]

Reichenbach

[11] Patent Number: 4,641,856
[45] Date of Patent: Feb. 10, 1987

[54] MOTOR VEHICLE ANTI-ROLL STABILIZER SYSTEM

[75] Inventor: Thomas G. Reichenbach, Livonia, Mich.

[73] Assignee: Ford Motor Company, Dearborn, Mich.

[21] Appl. No.: 758,613

[22] Filed: Jul. 24, 1985

[51] Int. Cl.[4] ............................................. B62D 9/02
[52] U.S. Cl. ..................... 280/772; 267/57; 280/700; 280/721
[58] Field of Search ............... 280/772, 695, 770, 721, 280/722, 723; 267/57

[56] References Cited

U.S. PATENT DOCUMENTS

| 2,941,815 | 6/1960 | Muller | 280/721 |
| 3,197,233 | 7/1965 | Van Winsen et al. | 280/112 A |
| 3,608,925 | 9/1971 | Murphy | 280/112 A |
| 3,893,680 | 7/1975 | Marcillat et al. | 280/6 H |
| 3,995,883 | 12/1976 | Glaze | 280/707 |
| 4,010,941 | 3/1977 | Kirkland | 267/57 |
| 4,206,935 | 6/1980 | Sheppard et al. | 280/723 |
| 4,337,958 | 7/1982 | Witt et al. | 280/16 |
| 4,361,346 | 11/1982 | Harris | 280/707 |

FOREIGN PATENT DOCUMENTS 1160313 12/1963 Fed. Rep. of Germany .

OTHER PUBLICATIONS

Ford Motor Company Shop Manual for 1982 Model Escort/Lynx Vehicles, p. 14-32-1.

Primary Examiner—John J. Love
Assistant Examiner—Kenneth R. Rice
Attorney, Agent, or Firm—Jerome R. Drouillard; Roger L. May

[57] ABSTRACT

A suspension system for a vehicle includes a suspension component pivoted to the chassis of the vehicle, a torsion bar attached at its first end to the suspension component and rotatably mounted at its second end to the chassis of the vehicle, and means for selectively restraining the rotation of the second end of the torsion bar relative to the chassis so as to urge the vehicle to maintain a level attitude.

19 Claims, 1 Drawing Figure

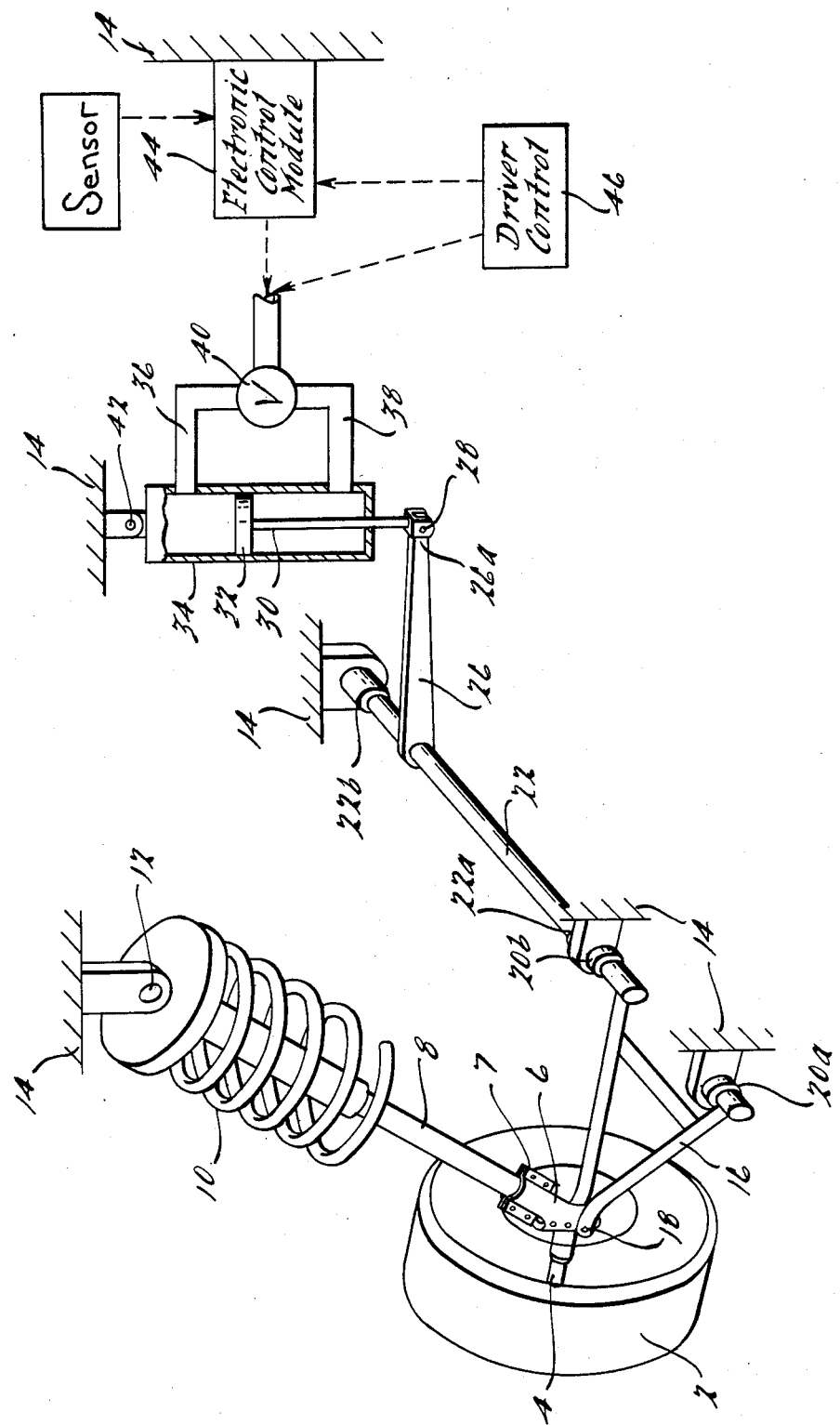

MOTOR VEHICLE ANTI-ROLL STABILIZER SYSTEM

BACKGROUND OF THE INVENTION

1. Field of the Invention

This invention relates to an anti-roll stabilizer system for a motor vehicle.

2. Description of Related Art

Torsional stabilizer bars have proven useful in vehicles for many years. Such stabilizer bars commonly employ a transverse torsion bar segment pivotally attached to the vehicle chassis and leading or trailing longitudinal segments attached to a control arm or wheel carrier. Examples of stabilizer bars having this particular configuration are shown in U.S. Pat. No. 4,206,935, which discloses several stabilizer bars capable of preferentially coupling the road wheels of a common axle together in a manner such that when one of the road wheels differs in level from the other due to a cornering maneuver the vehicle body will be prevented from excessive rolling or leaning to either side by the torsional resistance produced in the stabilizer bar.

U.S. Pat. No. 3,197,233 discloses a stabilizer system in which a bifurcated stabilizer bar is loaded torsionally by a hydraulic motor joining the two furcations. This system is limited because it requires an external pump driven by the vehicle's engine. It is further limited because torsional bias can be applied only when the vehicle is in a leaning situation; application of the bias when the vehicle is operating in the straight-ahead mode will cause the body to roll to one side. This necessarily limits the flexibility of the control strategy of the device. In addition, this device as well as the devices disclosed in U.S. Pat. No. 4,206,935 will degrade ride quality in many cases. This occurs because the stabilizer couples the wheels together. When one wheel strikes a raised obstruction in the roadway during straight running, the body will therefore tend to roll more than were no stabilizer bar included in a suspension system.

U.S. Pat. No. 4,337,958 discloses a suspension for a snowmobile having a stabilizer bar linked to both skis of the front suspension of a snowmobile. The action of the stabilizer bar is dampened by resilient yieldable means connected to a mid portion of the stabilizer bar. This system, of course, suffers from at least one of the drawbacks of the previously discussed systems inasmuch as the stabilizer couples both the left and right suspensions together.

The present invention utilizes a torsion bar or spring as a stabilizer element. Those skilled in the art will appreciate that torsion bars have been used in automotive suspensions in various ways for many years.

German Auslegeschrift No. 1,160,313 discloses a torsion bar suspension spring including a hydraulic cylinder for adjusting the static preload upon the torsion bar.

U.S. Pat. No. 4,010,941 discloses a stabilizer bar suspension for a military vehicle in which the working length of the stabilizer bar is adjustable to accommodate various vehicle loads.

The inhibition of excessive tilting or roll of the vehicle body in cornering maneuvers has been achieved by designers of suspension systems in which hydraulic or pneumatic cylinders directly support the vehicle body at each wheel position. Such suspension systems have included the ability to counteract excessive leaning of the body during cornering maneuvers. Examples of suspensions of this type are disclosed in U.S. Pats. Nos. 3,608,925; 3,893,680; and 4,361,346. The cost of these systems, however, would be expected to be quite high because components which must support the weight of the vehicle body and chassis must necessarily be of heavier construction and would also consume considerable power to function so as to provide roll control on a real time basis during vehicle operation.

U.S. Pat. No. 3,995,883 discloses yet another suspension arrangement in which a variable suspension damper is controlled by a microprocessor to produce desired ride characteristics. This suspension damper is coupled directly between the vehicle body or chassis and the balance of the suspension.

It is an object of the present invention to provide an anti-roll stabilizer system for a motor vehicle which will independently control each of the wheels to which it is applied.

It is a further object of the present invention to provide an anti-roll stabilizer system for a motor vehicle which will operate at a relatively low power level.

It is also a further object of the present invention to provide an anti-roll stabilizer system that is simple in terms of its design and construction and low in system weight.

It is a still further object of the present invention to provide an anti-roll stabilizer system which will not degrade vehicle ride when the vehicle is running straight ahead.

SUMMARY OF THE INVENTION

An anti-roll stabilizer system for motor vehicles includes a torsion bar rigidly attached at its first end to a suspension component subject to rotation relative to the chassis during jounce and rebound motion of the suspension system. This suspension component may include, for example, a control arm or wheel carrier. The second end of the torsion bar is attached to the chassis of the motor vehicle for rotation about the torsion bar's longitudinal axis. The invention further includes means for selectively restraining the rotation of the second end of the torsion bar relative to the chassis so as to restrain jounce and rebound motion of the suspension system.

The stabilizer system of the present invention may be used with a short-long arm suspension pivoted to the chassis of a motor vehicle. It may also be used with a conventional or modified MacPherson strut suspension. In view of this disclosure other suspension arrangements will suggest themselves for use with the present invention, it being appreciated that this invention may generally be applied to suspensions having at least one component which rotates relative to the chassis during suspension jounce and rebound.

Means for restraining rotation of the second end of the torsion bar relative to the chassis may include, for example, a valve for controlling the flow through a hydraulic cylinder linked to the torsion bar and an electronic control module associated therewith. The control module may be programmed to sense any of several vehicle opeating parameters such as turning motions, lateral acceleration, laterally acting forces, vehicle velocity, or steering gear motion.

As noted above, the present system functions to increase or decrease roll stiffness of the vehicle by selectively imposing resistance to rotation of the chassis-mounted end of the torsion bar. To accomplish this a torque arm is fixed to the torsion bar; in turn the torque arm is linked to the piston rod of a hydraulic cylinder. Movement of the piston rod and piston is subject to flow through a valve which may be controlled manually, or by an electronic control module, or by a combination of the two modalities. The control valve may be operated by a solenoid, or a servo motor, or another relatively fast acting operating mechanism.

Many types of sensors are suitable for use with this system and will readily suggest themselves to those reading this specification. For example, acceleration may be detected by means of accelerometers or other instruments; velocity may be detected by speedometer-driven signal generators or other means. Steering gear motion may be detected by means of optical sensors which note the position of the steering wheel or other sensors which track the position of the steering gear; other sensors will be suggested to those reading this specification.

BRIEF DESCRIPTION OF THE DRAWING

FIG. 1 is a schematic drawing of a vehicle suspension including the anti-roll stabilizer system of the present invention.

DETAILED DESCRIPTION OF THE PREFERRED EMBODIMENTS

As shown in the Figure, one example of a suspension arrangement for a vehicle including the anti-roll stabilizer system of the present invention includes wheel and tire assembly 2, which is rotatably mounted on spindle 4, which in turn is a component part of wheel carrier 6. Telescoping strut 8 is rigidly mounted to wheel carrier 6 at its lower end and fixed to chassis 14 of a motor vehicle by pivot 12 located at its upper end. Wheel carrier 6 includes a socket 7 for receiving the lower end of telescoping strut 8. An example of such a socket arrangement is shown in Ford Motor Company Shop Manual for 1982 model Escort/Lynx vehicles at page 14-32-1. Alternatively, the lower end of strut 8 could be fastened to wheel carrier 6 by means of a weldment. The upper end of strut 8 may be attached to chassis 14 by means of a simple pivot 12 as shown in FIG. 1 or by means of any one of several other types of pivotable connections such as those employing elastomeric isolators. An example of such a pivot arrangement is shown in Ford Motor Company Shop Manual for 1982 model Escort/Lynx vehicles at page 14-32-1.

A load carrying device 10, in this case a coil spring, is carried on the telescoping strut. This configuration thus comprises the well known MacPherson strut arrangement. Other suspension arrangements suitable for use with the anti-roll stabilizer of the present invention could employ a pneumatic or hydraulic load carrying device mounted about the exterior of the telescoping strut or interposed between control arm 16 and chassis 14. In the event that a short-long arm suspension were chosen for use with the present invention, the load carrying device could be interposed between the upper control arm and the chassis.

Control arm 16 is interposed between the wheel carrier and chassis. The outboard end of control arm 16 is pivoted to the wheel carrier at pivot 18. The inboard end of control arm 16 is pivoted to the chassis at points 20a and 20b. Although control arm 16 is shown in FIG. 1 as having two pivoted attachment points to chassis 14, this particular configuration is shown only for the purpose of explaining the present invention, it being understood that a control arm having a single inner pivot could be utilized as well as any other suspension arrangement characterized by one or more components capable of rotating about a pivot on the chassis during jounce and rebound. As illustrated in FIG. 1, pivots 20a and 20b comprise simple cylindrical bushings, but other pivot constructions could be employed such as that shown in U.S. Pat. No. 4,457,536. Control arm 16 is shown as being generally transverse with its inboard pivot axis extending in a generally longitudinal direction. It will be appreciated in view of this disclosure, however, that the inboard axis of rotation of the control arm could be inclined at an angle to the longitudinal centerline of the vehicle.

Torsion bar 22 is attached at its first end 22a to control arm 16. Torsion bar 22 is pivotally attached at its second end, 22b, to the chassis. Torsion bar 22 is positioned such that its longitudinal axis and hence, its axis of rotation, lies coincident with the axis of rotation of control arm 16 about points 20a and 20b. The attachment between control arm 16 and torsion bar 22 may comprise a weldment or some other form of rigid coupling, or alternatively some form of flexible coupling. In either event, the means for connecting the torsion bar to the control arm must prevent relative rotation of the control arm with respect to first end 22a of the torsion bar. Thus, the first end of the torsion bar will rotate in unison with the control arm during jounce and rebound movement of the control arm and wheel carrier.

Proper operation of the present invention does not rely upon any particular placement of the axis of rotation of the control arm, it being understood that the present system requires principally that the axes of rotation of the control arm and torsion bar be closely aligned.

Torsion bar 22 is operatively connected by means of torque arm 26 with a fluid cylinder 34 including piston rod 30 attached to piston 32. Cylinder 34 is attached to the chassis at pivot 42.

Torque arm 26 works as a crank in combination with the piston rod to convert the rotary motion of the torsion bar to the linear motion of the piston. The torque arm is preferably attached to the torsion bar in rigid fashion such as by welding, by a through bolt, by keying, or by any other means which will prevent the torque arm from rotating with respect to end 22b of the torsion bar. The free end of torque arm 26, marked 26a in the Figure, is pivoted to piston rod 30. Thus, when valve 40 blocks flow through conduits 36 and 38, piston 32 will be constrained from moving within the cylinder and piston rod 30 will prevent torque arm 26 from moving up and down at its free end. The force exerted by the piston and piston rod upon the free end of the torque arm is converted into a torque by the torque arm; this torque will then restrain rotation of end 22b of the torsion bar.

Flow within the cylinder is governed by valve 40, which is connected with the upper end of the cylinder assembly by conduit 36 and with the lower end of the cylinder assembly by means of conduit 38.

As shown in the Figure, operation of valve 40 is operable by either manual or automatic means or by a combination thereof. The manual system preferably includes a switch or potentiometer or other variable position control enabling the driver to select the desired degree of roll stiffness.

Valve 40 responds to commands from the driver control by restricting the flow of fluid through conduits 36 and 38. In the event, for example, that the driver selects the greatest level of roll stiffness, valve 40 will prevent any flow through conduits 36 and 38 and piston 32 will be hydraulically locked in place. As a result, piston rod 28 and torque arm 26 will be restrained from moving, as will second end 22b of the torsion bar. With end 22b restrained, the torsion bar will resist movement of the control arm and wheel carrier in jounce and rebound, thereby increasing the roll stiffness of the suspension system.

The electronic control module 44 is preferably programmed to modulate the operation of control valve 40 in response to the sensed presence of one or more vehicle operating conditions or parameters detected by one or more sensors. These may include, for example, lateral acceleration encountered during cornering, or laterally acting force resulting from cornering, or vehicle velocity, or steering wheel rotation, or steering gear movement, or any other operating parameter suggested by this disclosure. As an example, the electronic control module could incorporate a pendulum type accelerometer oriented in such a fashion as a detect lateral acceleration. In this example, turning movements of the vehicle producing lateral acceleration in excess of a preset threshold level will be sensed by the accelerometer. A signal from the accelerometer will be received and secured and processed by the electronic control module and a command will issue from the control module to valve 40, requiring the valve to restrict the flow within conduits 36 and 38. This restriction of flow will result in increased roll stiffness according to the previously described chain of events. The electronic control module will thus enable a suspension embodying the present invention to be compliant during normal ride and handling maneuvers, while at the same time providing the capability for a much stiffer or roll-stable system as the dictates of the roadway manifest themselves.

The combination of manual and electronic control modalities could be used to allow the driver to select threshold levels for application of the increased roll stiffness afforded by the present invention. Drivers preferring more "sporty" vehicle handling could, for example, choose to increase roll stiffness only when their vehicle has exceeded a given velocity.

As used herein, the terms "body" and "chassis" mean either conventional frame and body type automotive construction or a conventional unitized automotive construction or any combination thereof.

The invention has thus been shown and described with reference to specific embodiments; however, it should be noted that the invention is in no way limited to the details of the illustrated structures, but changes and modifications may be made without departing from the appended claims.

I claim:

1. A suspension system for independently controlling a vehicle wheel comprising:
    a chassis;
    a suspension component subject to rotational movement relative to the chassis during jounce and rebound movement of said suspension system with said rotational movement occurring about a fixed axis of rotation;
    a torsion bar attached at its first end to said suspension component and pivotally attached at its second end to said chassis, with the longitudinal axis of said torsion bar being generally coincident with said axis of rotation of said suspension component; and
    means for selectively restraining the rotation of said second end of said torsion bar relative to said chassis so as to restrain jounce and rebound motion of said wheel independently of any other wheel of said vehicle.

2. The suspension system according to claim 1 wherein said suspension component comprises a generally transverse control arm pivoted to said chassis at its inboard end and having an outboard end attached to a wheel carrier to which a wheel and tire assembly is rotatably mounted.

3. The suspension system according to claim 1 wherein said torsion bar is rigidly attached to said suspension component.

4. The suspension system according to claim 1 wherein said means for restraining the rotation of said second end of said torsion bar relative to said chassis is responsive to signals from one or more sensors.

5. The suspension system according to claim 1 further comprising a load carrying device interposed between said suspension component and said chassis.

6. The suspension system according to claim 1 wherein said means for restraining the rotation of said second end of said torsion bar relative to said chassis comprises a fluid cylinder.

7. The suspension system according to claim 6 wherein said means for restraining the rotation of said second end of said torsion bar relative to said chassis further comprises a torque arm rigidly attached to said second end of said torsion bar, said torque arm having a free end pivoted to a piston rod and piston carried within said fluid cylinder.

8. The suspension system according to claim 6 wherein said means for restraining the rotation of said second end of said torsion bar relative to said chassis further comprises means for controlling the flow through said fluid cylinder.

9. The suspension system according to claim 8 wherein said means for controlling the flow through said fluid cylinder comprises a valve and means for controlling the operation of said valve.

10. The suspension system according to claim 9 wherein said means for controlling the operation of said valve comprises a manually operable device.

11. The suspension system according to claim 9 wherein said means for controlling the operation of said valve comprises an electronic control module.

12. The suspension system according to claim 11 wherein said electronic control module receives signals from one or more sensors.

13. An anti-roll stabilizer system for independently controlling each of the wheels of a motor vehicle comprising:
    a torsion bar rigidly attached at its first end to a suspension component subject to rotation relative to the chassis of said motor vehicle during cornering maneuvers and rotatably attached at its second end to the chassis of said motor vehicle such that at least said first end of said torsion bar will rotate in unison with said suspension component; and
    means responsive to an operating parameter of said motor vehicle for selectively restraining the rotation of said second end of said torsion bar relative to said chassis.

14. The anti-roll stabilizer system of claim 13 wherein said torsion bar is substantially straight throughout its length.

15. The anti-roll stabilizer system according to claim 13 wherein said means for selectively restraining the rotation of said second end of said torsion bar relative to said chassis is responsive to lateral acceleration of said motor vehicle.

16. The anti-roll stabilizer system according to claim 13 wherein said means for selectively restraining the rotation of said second end of said torsion bar relative to said chassis is responsive to the velocity of said motor vehicle.

17. The anti-roll stabilizer system according to claim 13 wherein said means for selectively restraining the rotation of said second end of said torsion bar relative to said chassis is responsive to movement within the steering system of said motor vehicle.

18. A suspension system for independently controlling a motor vehicle wheel comprising:
a wheel carrier;
a telescoping strut pivoted to the chassis of said motor vehicle and rigidly mounted to said wheel carrier;
a wheel and tire assembly rotatably attached to said wheel carrier;
a load carrying device mounted to said strut;
a generally transverse control arm pivoted to said wheel carrier at its outboard end and pivoted to said chassis for rotation about a generally longitudinally extending pivot axis at its inboard end;
a torsion bar rigidly mounted at one end to said control arm and pivoted at a second end to said chassis with said second end located such that the longitudinal axis of said control arm is generally coincident with the inboard pivot axis of said control arm; and
means responsive to turning motion of said motor vehicle for limiting the rotation of said second end of said torsion bar with respect to said chassis.

19. The suspension system according to claim 17 wherein said torsion bar runs substantially parallel to the longitudinal centerline of said motor vehicle.

* * * * *